United States Patent [19]

Xuan et al.

[11] 4,323,834

[45] Apr. 6, 1982

[54] MOVEMENT DETECTOR FOR A STEPPING MOTOR

[75] Inventors: Mai T. Xuan, Chavannes; Marcel Jufer, Morges, both of Switzerland; André Pittet, Bangalore, India

[73] Assignee: Societe Suisse pour l'Industrie Horlogere Management Services S.A., Bienne, Switzerland

[21] Appl. No.: 181,929

[22] Filed: Aug. 27, 1980

[30] Foreign Application Priority Data

Sep. 4, 1979 [FR] France ................................ 79 22609

[51] Int. Cl.³ ........................ G05B 19/40; G04C 3/00

[52] U.S. Cl. ....................................... 318/696; 368/76

[58] Field of Search ....................... 318/696, 685, 138; 368/76

[56] References Cited

U.S. PATENT DOCUMENTS 4,192,131 3/1980 Hosokawa et al. ............ 318/696 X
4,217,751 8/1980 Torisawa et al. ..................... 368/76
4,241,433 12/1980 Ueda et al. ......................... 318/696 X

FOREIGN PATENT DOCUMENTS 2388323 3/1976 France .

OTHER PUBLICATIONS

Actes Du 10e Congress International de Chronometrie, Sep. 11, 1979, Partie 3, Buren (CH), A. Pittet et al., "Amelioration de la Fiabilite et de la Consomation d'Energie de Moteurs Pas a' Pas par une Technique d'Auto-Controle", pp. 73-80.

*Primary Examiner*—B. Dobeck
*Attorney, Agent, or Firm*—Griffin, Branigan & Butler

[57] ABSTRACT

The invention provides a feed arrangement for a stepping motor which enables step detection and responsive to failure to step applies a series of wide (long duration) pulses in place of the normal short duration pulses. The detector includes sampling means for a first signal developed by the voltage induced in the motor winding during a predetermined period and there are means to generate a second signal which is the integral of the first signal, the amplitude of the second signal indicating whether or not the motor has stepped. The invention may find use with a timepiece micromotor.

4 Claims, 8 Drawing Figures

Fig.1.
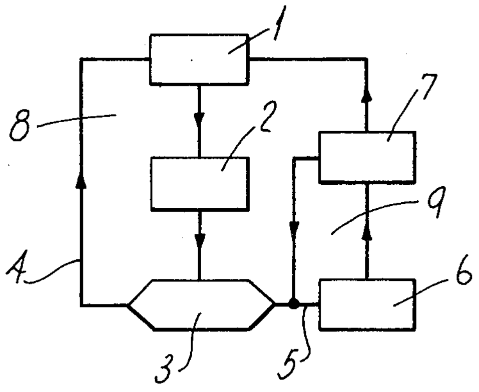
Fig. 2a.
Fig. 2b.
Fig. 2c.
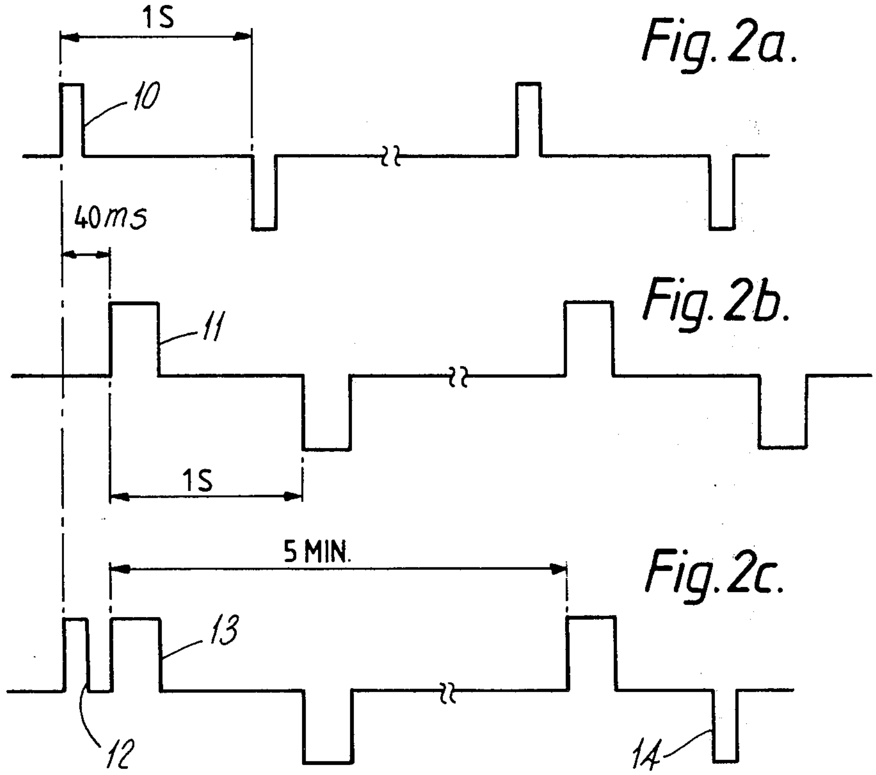

MOVEMENT DETECTOR FOR A STEPPING MOTOR

BACKGROUND OF THE INVENTION

The objective of the present invention is to provide a feeding arrangement enabling detection of the movement of a single phase stepping motor, as used for instance in a timepiece, and arranged to control the operation of the motor by supplying a first type of bipolar pulses of short duration or by supplying a second type of bipolar pulses of greater duration, a pulse train of the second type being fed to the motor in the event that the motor has failed to step in response to a short duration pulse.

Arrangements of this general nature are known and in order to overcome difficulties which may occur the applicant has proposed a new solution to the several problems in his U.S. application Ser. No. 162,227 and which claims an arrangement including a step detector having first means arranged to sample a first signal Ud developed by the current through the motor winding and second means arranged and adapted to generate a second signal $$Uc = \int_0^T Ud \cdot dt$$

the level of which indicates whether or not the motor has stepped in response to a pulse of the first type.

The above mentioned patent application proposes two possible means for sampling the first signal Ud developed by the current in the motor winding.

One detection means comprises a bridge of which one of the branches is constituted by the motor winding, one of the diagonals being fed by the motor pulses and the other diagonal providing the signal Ud. If this system presents certain advantages over those proposed by the state of the art it presents the difficulty of sampling only a very low voltage (on the order of 20 mV) this being the difference between two relatively high voltages (on the order of 1.5 V). Since the temperature coefficients of the resistance of the motor winding and that of the other resistances in the bridge are not the same it can be shown that the arrangement will not function reliably over an extended temperature range (for example −10° C. to +60° C.)

Another detection means proposed by the above mentioned application comprises a sensing winding inserted into the magnetic circuit of the motor, the voltage developed at the terminals of this winding providing a signal Ud. This signal has the advantage of eliminating the resistance bridge mentioned above as well as the losses which are brought about thereby, and if the winding comprises a sufficient number of turns the voltage obtained will be of an amplitude more easily detectable than that which occurs on the diagonal of the bridge. This arrangement however has the inconvenience of necessitating an auxiliary winding in the magnetic circuit of the motor thus increasing the manufacturing cost and complicating moreover the wiring within the watch.

It is the purpose of this invention to eliminate the difficulties mentioned above and to obtain a feeding arrangement which, although based on the general principal described in the cited patent application, proposes new means for sampling the signal Ud at the motor winding terminals.

This purpose is realised by use of the means as claimed.

BRIEF DESCRIPTION OF THE DRAWINGS

The invention will be better understood in the light of the description which follows and of the drawings which represent the functioning of the motor and of its feed arrangement.

FIG. 1 is a block diagram of a feed arrangement for control of the motor stepping.

FIG. 2 represents the various signals applied to the motor.

DETAILED DESCRIPTION OF THE INVENTION

Figure 3:
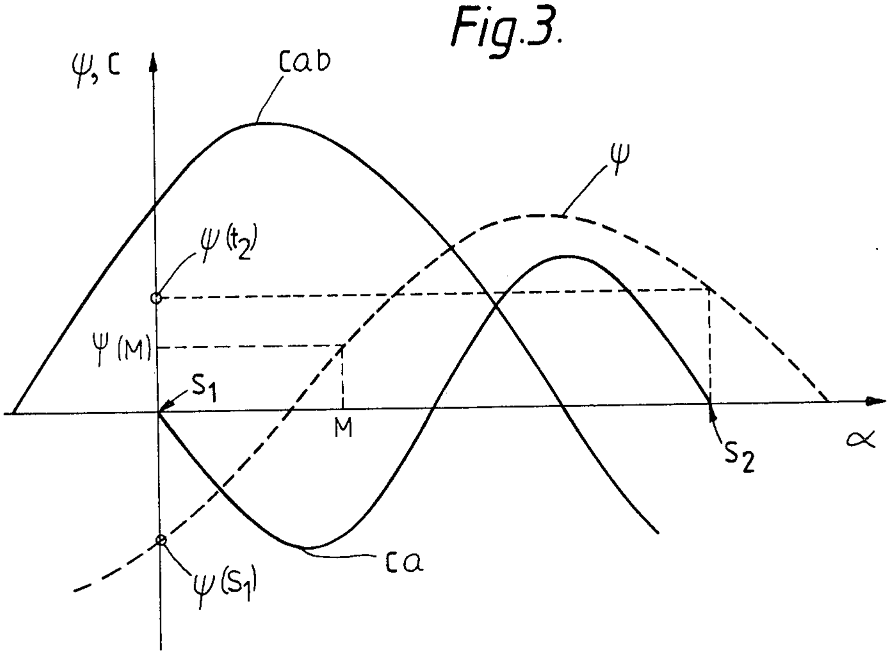
FIG. 3 shows the form of the mutual couple, positioning couple and the mutual flux magnet-to-winding as a function of the position of the rotor.

The invention now to be described has a prime object the reduction of current consumption by a timepiece motor. It has been determined that a micromotor for a watch functions for the most part almost with no load. At the same time to assure satisfactory functioning under special conditions, as for instance, temperature variations, exterior magnetic fields, shocks, angular accelerations, etc it is found necessary to overfeed the motor, this leading to purposeless consumption of battery energy. This invention proposes a new means for controlling the stepping of the motor, which permits the adaptation with large safety margins of the feeding as a function of the load. Consequently there results a substantial improvement in the energy consumption.

The general principal of the motor feeding such as has been mentioned in the patent application cited above is shown in FIG. 1 which is a block diagram of a feed arrangement with stepping control. The motor is normally fed by short duration pulses (for example 6 ms) emitted by generator 1. As position detector 2, object of the present invention, and which will be described in greater detail further on enables one to determine whether or not the motor has stepped. In the affirmative the decision organ 3 informs generator 1 via line 4 that is must continue to feed the motor. In the negative the same decision organ controls generator 6 via line 5 so as to provide long duration pulses (for example 8 ms) which feed the motor and which are substituted for the short duration pulses. This substitution takes place during a period of n seconds determined by counter 7. Following this lapse of time, the motor is once again fed by short duration pulses. It is seen that the motor is alternately fed and in accordance with its needs either by loop 8 giving short duration pulses, the detector being in operation, or by loop 9 giving pulses of long duration during a period determined by the counter, the detector being out of the circuit. The different anomalous situations which may arise during operation owing to causes such as previously mentioned last for a certain time. It will thus be understood that to send systematically a long pulse following each short pulse which has not stepped the motor would be wasteful of energy and contrary to the purpose at which the invention aims. The period during which long duration pulses are sent to the motor is on the order of five minutes but other values might equally be chosen.

FIG. 2*a* represents the train of short duration pulses which is sent to the motor to effect stepping thereof. Pulses 10 which are bipolar and of a duration of about 6 ms are emitted each second by generator 1. FIG. 2*b* represents the train of long duration pulses 11 of a duration on the order of 8 ms emitted by generator 6, these pulses also succeeding one another at the rhythm of one each second. For reasons which will be set forth later the beginning of the long pulse is staggered 40 ms relative to the beginning of the short duration pulse and when, following pulse 12 shown in FIG. 2*c*, the position detector determines the absence of rotation, the series of long pulses 13 is sent to the motor during about 5 minutes, following which the motor is again switched to the short pulses 14.

FIG. 3 represents the value of couples C which act on the rotor as a function of its rotation angle $\alpha$. As is well known, the rotor of the stepping motor is subject to two types of couples: a static retaining couple Ca due to the magnet alone and the dynamic motor couple Cab due to the interaction of the flux of the magnet with the flux of the winding whenever the latter is energised. Initially the rotor is in position $S_1$. If a pulse is sent to the motor and steps the rotor it will be found in position $S_2$. On the same FIG. 3 has been represented the value of the mutual flux, winding-magnet $\Psi$ as a function of the rotation angle of the rotor. The present invention is based on determining the value of this flux which may take different values according to whether the motor has stepped or not.

In the above cited patent application the applicant proposed to integrate the tension measured at the terminals of the motor between time $t=0$ and $t=T\cong 30$ ms for which all current has ceased to flow in the motor winding. This method obliges the utilisation of a resistance type bridge or of an auxiliary winding as has already been explained.

The present invention proposes to utilise only the main winding of the motor in order to detect the flux difference which is equal to the voltage induced as developed at the winding terminals and integrated between two limits which will be defined subsequently. Since this winding is not available during the feeding time when the motor impulse is applied, the integration may not take place starting at time $t=0$ but at time $t=t_2$ which provides the time necessary for the motor to make its step, that is to say, pass from position $S_1$ to position $S_2$.

As shown in FIG. 3 the value of the flux $\Psi$ amounts $\Psi(t_2)$ if the rotor has stepped and finds itself in position $S_2$. This value will be the same if one measures it at time $t_3$ following time $t_2$ and which itself is spaced at several ms. Consequently $$Uc = \frac{1}{RC} \int_{t_2}^{t_3} Ui\,dt = \frac{1}{RC} [\psi(t_3) - \psi(t_2)] = 0$$

since $\Psi(t_2)=\Psi(t_3)$ as has just been indicated. This signifies that if the rotor has stepped the voltage output of the integrator is substantially zero.

It will now be supposed that following an increase in load the rotor has failed to step. In this case as shown by FIG. 3 the rotor will be found at time $t=t_2$ for example at the point M situated between $S_1$ and $S_2$. At this position there is a flux value corresponding $\Psi(M)$. At the time $t=t_3$ the rotor will return to its point of departure $S_1$ for which the value of the flux is $\Psi(S_1)$. Consequently $$Uc = \frac{1}{RC} \int_{t_2}^{t_3} Ui\,dt = \frac{1}{RC} [\psi(S_1) - \psi(M)] \neq 0$$

which signifies that if the rotor has failed to step the voltage at the output of the integrator will be different from zero.

This demonstration shows that in integrating the induced voltage developed by the motor between a time $t=t_2$ which is that necessary for the displacement of the rotor to its new position $S_2$ and a time $t=t_3$ after time $t_2$ and which spaced therefrom by an interval of several milliseconds one may obtain two voltage levels of considerably different value according to whether the motor has stepped or not. In order to make this measurement it is necessary to open circuit the motor between the times $t_2$ and $t_3$, this being realised by a switching circuit to be explained subsequently. Between the feed period (0 to $t_1$) and the measuring period of the induced voltage ($t_2$ to $t_3$) there is foreseen a period ($t_1$ to $t_2$) during which the winding is short circuited, this serving to stabilise the rotor movement. In the same manner there is foreseen between the period $t_2$ to $t_3$ and the moment at which a further motor pulse arrives a period $t_3$ to $t_4$ where the motor winding is also short circuited, this better enabling the motor to resist shocks which may arrive.

Figure 4:
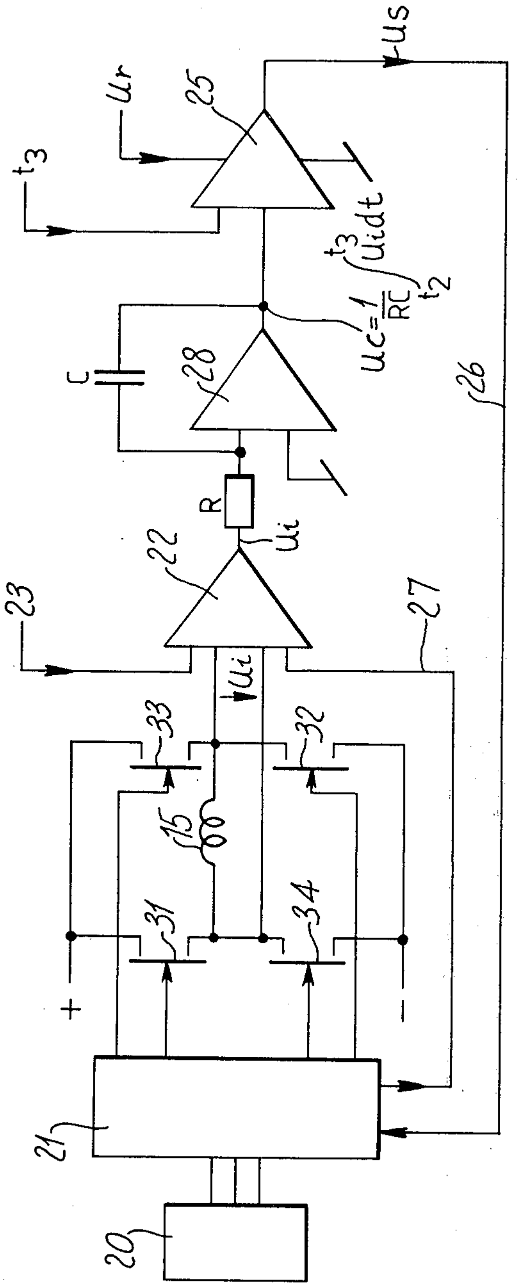
FIG. 4 shows a schematic of the principal of the position detector in accordance with the invention.

FIG. 4 shows a block diagram of a possible arrangement for obtaining the desired results. In this block, winding 15 of the motor receives alternating pulses when switches 31–32, and respectively 33–34 are closed. These switches form a switching circuit. The table shown hereinafter indicates the position of switches 31 to 34 as a function of periods (0 to $t_1$), ($t_3$ to $t_4$) as defined above and in accordance with the invention. For a positive pulse the control sequence of the switches is established in the following manner.

| | Switches | | | |
|---|---|---|---|---|
| Period | 31 | 32 | 33 | 34 |
| 0 to $t_1$ (0 to 5,5 ms) | closed | closed | open | open |
| $t_1$ to $t_2$ (5,5 to 12 ms) | closed | open | closed | open |
| $t_2$ to $t_3$ (12 to 30 ms) | open | open | open | open |
| $t_3$ to $t_4$ (30 ms to 1 s) | closed | open | closed | open |

It is evident that in the techniques actually employed transistors will be used in the role of switches. Moreover the values of the periods are indicative only and suitable for a certain motor construction. Other values could equally be chosen without departing from the object of the invention.

The switching circuit 31 to 34 is controlled by a pulse former 21 which itself receives information from a oscillator divider circuit 20. The circuit 21 includes the pulse generator 1 for short duration pulses and the pulse generator 6 for long duration pulses as well as the counter 7 such as has already been explained in respect of FIG. 1. The control electrodes for transistors 31 to 34 are controlled by signals as shown in FIG. 2*a* according to the table above or by signals according to FIG. 2*c* according to whether the rotor of the motor has stepped or not. The voltage Ui obtained at the terminals of winding 15 is connected to the input of a differential circuit 22. A control signal 23 opens this circuit during a period from $t_2$ to $t_3$ only, that is to say during the time that the induced voltage developed by the motor must be read. The voltage Ui gathered at the output of circuit 22 which has become assymetric may be integrated in integrator 28. At the output of the integrator the signal $$Uc = \int_{t_2}^{t_3} Ui \cdot dt$$

is compared to a reference signal Ur in a comparator 25.

This comparison takes place at the end of the integration period, that is to say at time $t_3$ in view of a clock signal provided by the frequency divider. If Uc is smaller than Ur the motor has made its step and no output signal will appear at the output of the comparator: the control circuit thus will continue to provide short duration motor pulses. If to the contrary Uc is greater than Ur the motor has not stepped and a signal Us will appear at the output of the comparator which via line 26 operates on the control circuit in order that a series of long duration pulses 13 as shown in FIG. 2*c* will be emitted. During that time that impulses 13 are being produced the circuit 22 is blocked by line 27.

As explained above the measure of voltage Uc by the comparator takes place at the end of the integration period at time $t_3$. As time $t_3$ occurs at about 30 ms one will understand the reason for the shift between the beginning of the short pulse and the beginning of a series of long pulses as shown in FIG. 2*c*. This time displacement depends naturally from the moment chosen at which the voltage Uc is to be measured, since the train of long pulses will be switched when necessary only after such measurement. The figure shows a time-shift of 40 ms for a measurement made following 30 ms. If this measurement is made earlier in accordance with the type of motor for example after 20 ms the shift or time displacement may be shortened to 30 ms.

Figure 5:
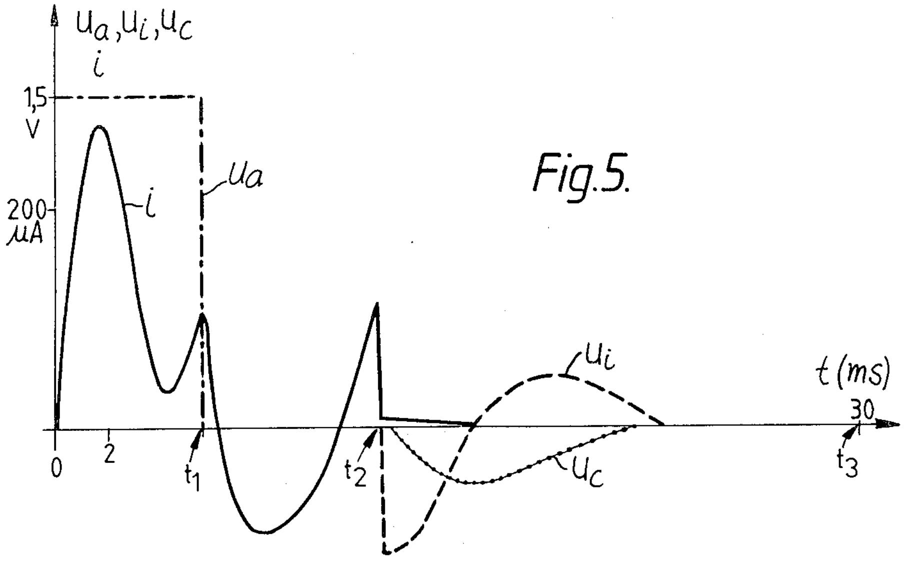
FIG. 5 is a graph showing the feed voltage Ua, the induced voltage Ui, and the voltage Uc at the output of the integrator when the rotor has stepped.

FIG. 5 is a graph showing the voltage at the terminals of the motor, Ua being the feed voltage, Ui the induced voltage following time $t_2$, and Uc the voltage at the output of the integrator. The graph shows also current i in the motor winding. In this case the load applied to the motor is on the order of 0.05 $\mu$Nm and it will be observed that the motor has stepped. The voltage Uc taken from the output of the integrator is 0 at time $t_3$ (30 ms), the instant of measurement by the comparator, and no signal will appear at the output of said comparator.

Figure 6:
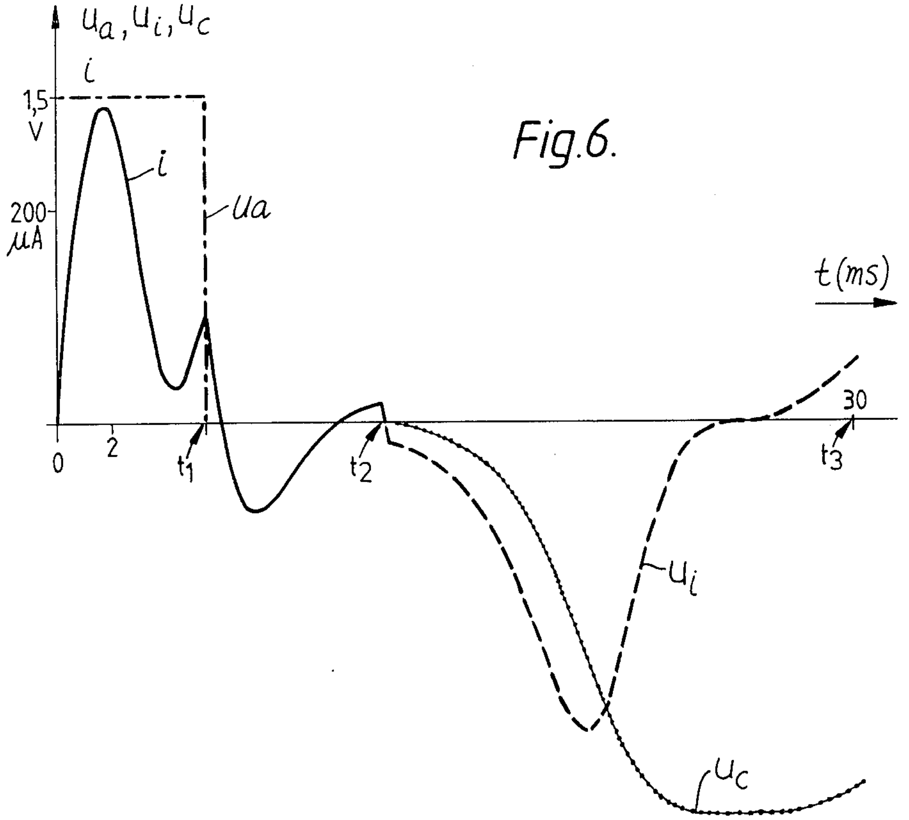
FIG. 6 is a graph showing the same parameters as FIG. 5 when the rotor has failed to step.

FIG. 6 is a graph representing the situation for the same motor for a load of 0.1 $\mu$Nm and for which it will be observed that the rotor has failed to step. The voltage Uc picked up at the output of the integrator is of substantial magnitude at time $t_3$ (30 ms) the instant at which measurement is made by the comparator and a signal will appear at the output of said comparator thereby instructing the control circuit to provide a series of long duration pulses.

The improvements which have just been described provide the motor with a very reliable and close control, this control having for purpose, as already mentioned, to limit the energy consumption of a timepiece by integrating the induced voltage developed at the motor terminals. The system may be suited to any type of stepping motor. Should such motor be dimensioned for the control function as proposed in the present description an energy economy on the order of 60% may be obtained.

What we claim is:

1. A feed arrangement for a single phase timepiece stepping motor arranged to control the functioning of the motor by means of a first type of bipolar pulses of relatively small width or by a second type of bipolar pulses of greater width, a series of pulses of the second type being applied to the motor whenever said motor has failed to step in response to pulses of the first type wherein first means are provided which responsive to each bipolar pulse of the first type within a first time period $0$–$t_1$ open circuit the motor during a second time period $t_2$–$t_3$ and second means are provided to detect a first signal Ui developed at the motor terminals during said second time period and to generate a second signal $$Uc = \int_{t_2}^{t_3} Ui\, dt$$

which when of greater magnitude to a predetermined reference signal indicates that the motor has failed to step in response to a bipolar pulse of said first type.

2. A feed arrangement as set forth in claim 1 wherein means are provided to short circuit the motor during a time period $t_1$–$t_2$ situated between said first time period and said second time period and during a time period $t_3$–$t_4$ situated between said second time period and the arrival of the next motor drive pulse.

3. A feed arrangement as set forth in claim 1 wherein said first means includes a control system adapted to control the operation of the motor by pulses of the first type having therein an oscillator, a frequency divider, a pulse former and a switching circuit incorporating the motor winding and said second means comprises a differential circuit arranged to sample said first signal, an integrator arranged and adapted to generate the second signal Uc through integration of the first signal and a comparator arranged to receive said second signal along with a reference signal Ur and adapted to produce a detection signal Us if the motor has failed to step in response to a bipolar pulse of the first type.

4. A feed arrangement as set forth in claim 2 wherein the time periods are chosen to lie within the following ranges

| | |
|---|---|
| $t_0$–$t_1$ | 2 ms–7 ms |
| $t_1$–$t_2$ | 6 ms–13 ms |
| $t_2$–$t_3$ | 12 ms–20 ms |

* * * * *